Patented Mar. 23, 1948

2,438,278

UNITED STATES PATENT OFFICE 2,438,278

METHOD FOR AZEOTROPIC DISTILLATION OF ACETIC ANHYDRIDE

Charles H. Fisher, Abington, Pa., and Martin L. Fein, Riverside, N. J., assignors to the United States of America as represented by the Secretary of Agriculture No Drawing. Application June 29, 1944, Serial No. 542,790

10 Claims. (Cl. 202—42)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to methods for separating acid anhydrides from their solutions with other organic chemicals, and particularly to the separation of acetic anhydride from mixtures containing acetic anhydride, esters of lactic acid and other materials by azeotropic distillation.

Acetic anhydride is used as a convenient and valuable agent in the acetylation of various hydroxy compounds, including hydroxy compounds such as methyl lactate and other esters of hydroxy acids. When acetic anhydride is used to acetylate methyl lactate, it is difficult to effect a thorough and satisfactory separation of the acetylation product, methyl alpha-acetoxypropionate or methyl acetyl lactate, and unreacted acetic anhydride. Most of the acetic anhydride, boiling at 138° C., can be removed by distillation from methyl acetoxypropionate (boiling point 172° C.), but it is very difficult to remove acetic anhydride by distillation from acetic anhydride methyl acetoxypropionate mixtures when the content of anhydride is approximately 7% or less. It is desirable to have efficient and low-cost methods for separating these two chemicals because methyl acetoxypropionate yields methyl acrylate, a valuable synthetic rubber and resin intermediate, on pyrolysis. The presence of acetic anhydride, even in small proportions, in methyl acetoxypropionate is undesirable because acetic anhydride is corrosive and special corrosion-resistant pumps, tanks, pipes, and equipment would be required to handle methyl acetoxypropionate prior to passage through the pyrolysis unit. Moreover, the presence of acetic anhydride would lower throughput and hence require a larger pyrolysis unit for the production of any given quantity of methyl acrylate by the pyrolysis of methyl acetoxypropionate.

An object of this invention is to provide a method for separating acetic anhydride from its mixtures which are otherwise difficult to fractionate by distillation.

Another object is to provide entraining agents which distill azeotropically with acetic anhydrides, thereby facilitating the separation by distillation of acetic anhydride from its mixtures.

Still another object is to provide an improved method for purifying methyl acetoxypropionate prepared by the action of acetic anhydride on methyl lactate. A further object is to provide a method for decreasing corrosion costs in plants which produce methyl acrylate by acetylating methyl lactate and pyrolyzing methyl acetoxypropionate. Other objects and advantages of our invention will appear hereinafter.

We have found that certain hydrocarbons and hydrocarbon mixtures distill as a constant-boiling mixture with acetic anhydride. We have discovered that some of the hydrocarbons which distill azeotropically with acetic anhydride form with acetic anhydride a distillate which separates into two layers, the upper and lower layers consisting mainly of the hydrocarbon and acetic anhydride, respectively. The upper hydrocarbon layer may be separated and returned to the distillation flasks or column to distill azeotropically with more acetic anhydride, and the lower acetic anhydride layer may be stored, purified, or used in subsequent acetylation operations.

We have discovered also that acetic anhydride-methyl acetoxypropionate mixtures, even those that are difficult to fractionate by the usual distillation method, may be separated readily by adding certain hydrocarbons or hydrocarbon mixtures, followed by distillation of the hydrocarbon-acetic anhydride azeotrope, which distills at a lower temperature than acetic anhydride. We have found that methylcyclohexane and ethylcyclohexane are particularly useful for distilling acetic anhydride azeotropically.

The following examples illustrate but do not limit our invention:

Finding that it is difficult to remove small amounts of acetic anhydride from its solutions with methyl acetoxypropionate, methyl lactate was acetylated with different amounts of acetic anhydride and the reaction products were then distilled. A sharp separation of acetic anhydride and methyl acetoxypropionate could not be effected even when a fractionating column was used. Pure acetic anhydride and pure methyl acetoxypropionate were then mixed to form a solution containing approximately 5% acetic anhydride. When fractionation was attempted, the acetic anhydride distilled with the lactic ester over the range of approximately 155 to 169° C.

The separation of acetic anhydride and methyl acetoxypropionate was effected easily by adding methylcyclohexane or ethylcyclohexane prior to distillation. When methylcyclohexane was added, the acetic anhydride distilled with the methylcyclohexane at about 99° C., the distillate separating into two layers. When ethylcyclohexane was used in a similar manner, the acetic anhydride azeotrope distilled at about 118° C., and the distillate separated into two layers.

The removal of acetic anhydride from methyl acetoxypropionate may also be effected by adding either methylcyclohexane or ethylcyclohexane, distilling, condensing the vapors in the Barrett modification of the Dean and Stark tube, and returning the upper layer to the distillation flask, the acetic anhydride layer being withdrawn from the bottom of the Dean and Stark trap.

The following data relate to the azeotropes of acetic anhydride with methylcyclohexane and with ethylcyclohexane.

*Acetic anhydride azeotropes*

| Second Component | Boiling Points, ° C. | | Constant boiling mixture | Layers in condensate, per cent of total volume | |
|---|---|---|---|---|---|
| | Acetic anhydride | Second component | | Acetic anhydride | Second component |
| Methylcyclohexane | 138 | 101 | 98–9 | 18 | 82 |
| Ethylcyclohexane | 138 | 131 | 118–9 | 37 | 63 |

An essentially saturated petroleum hydrocarbon fraction, which apparently had the following properties, was found to distill azeotropically with acetic anhydride: B. P. 104 to 105° C.; sp. gr. at 60° F., 0.73–0.75; A. P. I. gravity at 60° F., 55 to 61; aniline pt., 125–135. The distillate, most of which came over between 115° and 125° C., separated into two layers. The lower and upper layers were mainly acetic anhydride and hydrocarbons, respectively.

Other modifications include the separation of acetic anhydride by azeotropic distillation from mixtures not containing methyl acetoxypropionate or from mixtures containing materials other than methyl acetoxypropionate, acetic anhydride, and the entraining agent. Various types of distillation equipment may be used, and the acetic anhydride may be separated by either batch or continuous distillation methods. The entraining agent, such as ethylcyclohexane, may be added prior to the acetylation of the alkyl lactate. Other entraining agents may be used, such as n-heptane, n-octane, n-nonane, n-decane, and undecane.

Having thus described our invention, we claim:

1. The method for separating acetic anhydride from solutions containing it and methyl alpha acetoxypropionate which comprises adding to the solutions an entraining agent boiling within the range of 90° C. to 150° C. comprising at least one member of the group consisting of normal paraffinic hydrocarbon, a mixture of normal paraffinic hydrocarbons, a saturated cyclic hydrocarbon, and a mixture of saturated cyclic hydrocarbons, followed by distillation thereof.

2. The method for separating acetic anhydride from solutions containing it and methyl alpha acetoxypropionate which comprises adding to the solutions an entraining agent boiling within the range of 90° C. to 150° C. comprising at least one member of the group consisting of normal paraffinic hydrocarbon, a mixture of normal paraffinic hydrocarbons, a saturated cyclic hydrocarbon, and a mixture of saturated cyclic hydrocarbons, followed by distillation thereof, collecting the distillate and permitting it to separate into layers, and recycling the upper layer thereof.

3. The method for separating acetic anhydride from solutions containing it and methyl alpha acetoxypropionate which comprises adding to the solutions methylcyclohexane, followed by distillation thereof.

4. The method for separating acetic anhydride from solutions containing it and methyl alpha acetoxypropionate which comprises adding to the solutions ethylcyclohexane, followed by distillation thereof.

5. The process for separating acetic anhydride from methyl alpha-acetoxypropionate which comprises adding to the mixture a saturated normal hydrocarbon boiling within the range of 90° C. to 150° C., followed by distillation.

6. In the process of purifying methyl alpha-acetoxypropionate contaminated with acetic anhydride, the steps comprising adding methylcyclohexane, followed by distillation thereof.

7. In the process of purifying methyl alpha-acetoxypropionate contaminated with acetic anhydride, the steps comprising adding ethylcyclohexane, followed by distillation thereof.

8. In the separation of acetic anhydride from solutions containing it, said solutions being characterized by the fact that it is difficult to separate the acetic anhydride therefrom by ordinary distillation methods, the steps comprising adding an entraining agent to the solution, said entraining agent being characterized by the fact that it will boil within the range of 90° C. to 150° C., will form an azeotrope with the acetic anhydride in the solution, and is selected from the group consisting of normal paraffinic hydrocarbons, a mixture of normal paraffinic hydrocarbons, saturated cyclic hydrocarbons, and mixtures of saturated cyclic hydrocarbons, then fractionally distilling the mixture and recovering the resulting acetic anhydride-entraining agent azeotrope.

9. In the separation of acetic anhydride from solutions containing it and methyl alpha-acetoxy propionate which comprises adding to the solution an entraining agent boiling within the range of 90° C. to 150° C. to form an azeotrope with the acetic anhydride, said agent comprising at least one member of the group consisting of normal paraffinic hydrocarbons, mixtures of normal paraffinic hydrocarbons, saturated cyclic hydrocarbons, and mixtures of saturated cyclic hydrocarbons, followed by distillation thereof.

10. In the separation of acetic anhydride from solutions containing it and methyl alpha-acetoxy propionate which comprises adding to the solution an entraining agent boiling within the range of 90° C. to 150° C. in a quantity at least sufficient to form an azeotrope with substantially all the acetic anhydride present, said agent comprising at least one member of the group consisting of normal paraffinic hydrocarbons, mixtures of normal paraffinic hydrocarbons, saturated cyclic hydrocarbons, and mixtures of saturated cyclic hydrocarbons, followed by distillation thereof.

CHARLES H. FISHER.
MARTIN L. FEIN.

REFERENCES CITED

The following references are of record in the file of this patent:

UNITED STATES PATENTS

| Number | Name | Date |
|---|---|---|
| 1,813,636 | Petersen | July 7, 1931 |
| 1,815,802 | Schleicher | July 21, 1931 |
| 1,947,977 | Dreyfus | Feb. 20, 1934 |

OTHER REFERENCES

Fein et al., 36 Industrial and Engineering Chemistry, (March 1944). (Copy in Scientific Library.)